United States Patent
Roebke

(10) Patent No.: US 8,183,790 B2
(45) Date of Patent: May 22, 2012

(54) LED READING LIGHT AND METHOD FOR OPERATING AN LED READING LIGHT

(75) Inventor: Steffen Roebke, Paderborn (DE)

(73) Assignee: Goodrich Lighting Systems GmbH, Lippstadt (DE)

( * ) Notice: Subject to any disclaimer, the term of this patent is extended or adjusted under 35 U.S.C. 154(b) by 388 days.

(21) Appl. No.: 12/535,822

(22) Filed: Aug. 5, 2009

(65) Prior Publication Data

US 2010/0039046 A1 Feb. 18, 2010

Related U.S. Application Data

(60) Provisional application No. 61/088,747, filed on Aug. 14, 2008.

(51) Int. Cl.
*H05B 41/36* (2006.01)
*H05B 41/24* (2006.01)
*G05F 1/00* (2006.01)

(52) U.S. Cl. .................. 315/291; 315/247

(58) Field of Classification Search .......... 315/291, 315/307, 308, 211, 247, 209 R
See application file for complete search history.

(56) References Cited

U.S. PATENT DOCUMENTS 6,057,651 A * 5/2000 Usami ............... 315/291
2007/0152604 A1 * 7/2007 Tatsumi ............ 315/247

* cited by examiner

*Primary Examiner* — Daniel D Chang
(74) *Attorney, Agent, or Firm* — Jerry J. Holden; John D. Titus

(57) ABSTRACT

The LED reading light, in particular for a passenger transportation vehicle such as, for example, an airplane, a bus, or a ship, is provided with two power supply connections (17) for connection to a power supply unit (16), an LED light means for giving off light with a desired light intensity, and a coding component (14), in particular a coding resistor, which is connected to at least one of the power supply connections (17), where the electrical parameter of the coding component (14) specifies the magnitude of a power supply current which can be provided for the LED light means by the power supply unit (16). Furthermore, the LED reading light is provided with a current controller (18) which is connected between the coding component (14) and the LED light means (12) and provides an operating current for the operation of the LED light means (12). The coding component (14) exhibits the electrical parameter for the provision of the maximum possible power supply current and the current controller (18) adjusts the operating current to a value at which the LED light means (12) gives off light with the desired light intensity.

5 Claims, 3 Drawing Sheets

LED READING LIGHT AND METHOD FOR OPERATING AN LED READING LIGHT

CROSS-REFERENCE TO RELATED APPLICATIONS

This application claims priority of U.S. provisional application No. 61/088,747, filed Aug. 14, 2008.

BACKGROUND OF THE INVENTION

The invention relates to interior lighting systems for a passenger transportation vehicle such as an airplane, a bus, or a ship and, in particular an LED reading light for an airplane, bus, or similar passenger transportation vehicle.

In passenger transportation vehicles, such as, for example, airplanes, buses, ships, or vehicles which run on rails (for example, railroad cars) seat lights or reading lights are used which are provided to an increasing extent with LED light means. So that the illumination is uniform, one aims to use LED light means which emit light at essentially equal intensity. In so doing, the set of problems consists in, among other things, the fact that the LED light means can only be produced with a non-negligible production-related tolerance. In the case of certain applications of an LED light means, e.g., in its use in a reading light for an air-plane, the LED light means is thus coded, which, for example, is done by a coding resistor which is read out by a power supply unit which actuates the LED light means and specifies with what current the LED light means must be operated in order to give off light with the desired light intensity.

For application in an airplane as an LED reading light, the LED light means are at present classified in one of a few classes (currently there are four classes) of LED light means and codes accordingly by the coding resistors. The power supply unit feeds a small test current into the LED light means when it is switched on in order to measure the voltage drop over the coding resistor. In so doing, the test current is chosen to be so small that the voltage drop over the coding resistor in any case remains under the forward voltage of the LED light means so that it (still) gives off no light. According to the value of the voltage drop, one of several (at present four) possible constant currents for supplying the LED reading light is then subsequently set.

As a consequence of the modernization of the LED manufacturing technologies and the use of the most varied semiconductor materials with the most varied dopings, to an increasing extent LED light means can be manufactured which can no longer be assigned to the classes of LED light means presently used in the aerospace industry. So one aims in the manufacture of modern LED light means to further reduce their power dissipation. Thus the forward voltages of the LEDs are being reduced ever further, which on the one hand means that the power supply currents for reaching the desired light intensity are becoming smaller but on the other hand also means that the voltage drop caused by the test current at the coding resistor no longer necessarily lies below the forward voltage. Both of these things make it more difficult to an increasing extent to meet the present specification requirements in effect in the civilian aerospace industry for LED light means for LED reading lights. The problem could, for example, be solved by the power supply units being adapted to the modern LED light means. This however is also not possible without problems since the changeover of the power supply units means a great technological effort which the manufacturers of, in particular, civilian airplanes do not wish to take on. Furthermore, the airlines demand that defective LED light means of reading lights can be exchanged for new LED light means without new power supply units also being required for the operation of these new LED light means.

SUMMARY

It is the objective of the invention to provide, in particular for a passenger transportation vehicle, an LED reading light which despite the use of modern LED light means can be operated by means of the power supply units used in particular in civilian airplanes to give off light with the desired light intensity.

For the realization of this objective we propose with the invention an LED reading light, in particular for a passenger transportation vehicle, such as, for example, an airplane, a bus, or a ship, where the LED reading light is provided with
  two power supply connections for connection to a power supply unit,
  an LED light means for giving off light with a desired light intensity, and
  a coding component, in particular a coding resistor, with an electrical parameter which specifies the magnitude of power supply current which can be provided for the LED light means by the power supply unit,
  a current controller which provides an operating current for the operation of the LED light means,
  where the coding component exhibits the electrical parameter for the provision of the maximum possible power supply current, and
  where the current controller adjusts the operating current to a value at which the LED light means gives off light with the desired light intensity.

According to the invention it is therefore also proposed with the invention to no longer use primarily the passenger transportation vehicle's power supply unit for the operation of the LED light means of an LED reading light but rather a unit integrated into the LED reading light, namely a separate current controller. In so doing, the LED reading light will however continue to comprise a coding resistor, or in general an electrical coding component, which is read out in the customary manner by the supply unit installed in the passenger transportation vehicle. The special feature consists in the fact that this coding component exhibits the electrical parameter, or the electrical characteristic quantity (for example, the value of the resistance), i.e., is coded, in such a manner that the power supply unit provides the maximum power supply current. With the aid of the additional current controller this maximum power supply current is adjusted (down) to the quantity which is required for the operation of the LED light means so that the LED light means gives off light with the desired light intensity. The magnitude of the operating current required for the respective LED light means is stored in coded form in the LED reading light, which is realized either by an electrical component (such as, for example, a resistor) or so that it can be programmed by a microprocessor.

In the initialization or in the switching on of the LED reading light the coding component, that is, for example, the coding resistor, is therefore read out by the power supply unit as before. The power supply unit then recognizes that the coding resistor is signaling the maximum power supply current. The current controller is then operated with this supply power thus provided, said current controller adjusting the constant current for the LED light means to a value adapted to that light means.

With the LED reading light's circuit formed in this manner this LED reading light can be operated as a customary LED reading light by the power supply unit installed in the passenger transportation vehicle. For example, the LED reading light according to the invention can be dimmed up and down by the power supply unit, as is presently the case when switching LED reading lights on and off in airplanes.

With the invention we also propose for the realization of the objective specified above a process for the operation of an LED reading light, in particular for a passenger transportation vehicle such as an airplane, a bus, or a ship, where in that process a power supply current for an LED light means is generated by a superordinate power supply unit, an LED light means with a coding component representing the maximum possible current feed is connected to the power supply unit, an operating current for the maximum possible current feed is generated by the power supply unit, and a current controller for providing the LED light means with an operating current is connected to the power supply unit, where the current controller for the LED light means with which the LED reading light is equipped adjusts the operating current to a magnitude at which the LED light means gives off light with the desired light intensity.

BRIEF DESCRIPTION OF THE DRAWING

The invention will be explained in more detail in the following with the aid of two embodiment examples and with reference to the drawings. In detail, in connection with this

DETAILED DESCRIPTION

Figure 3:
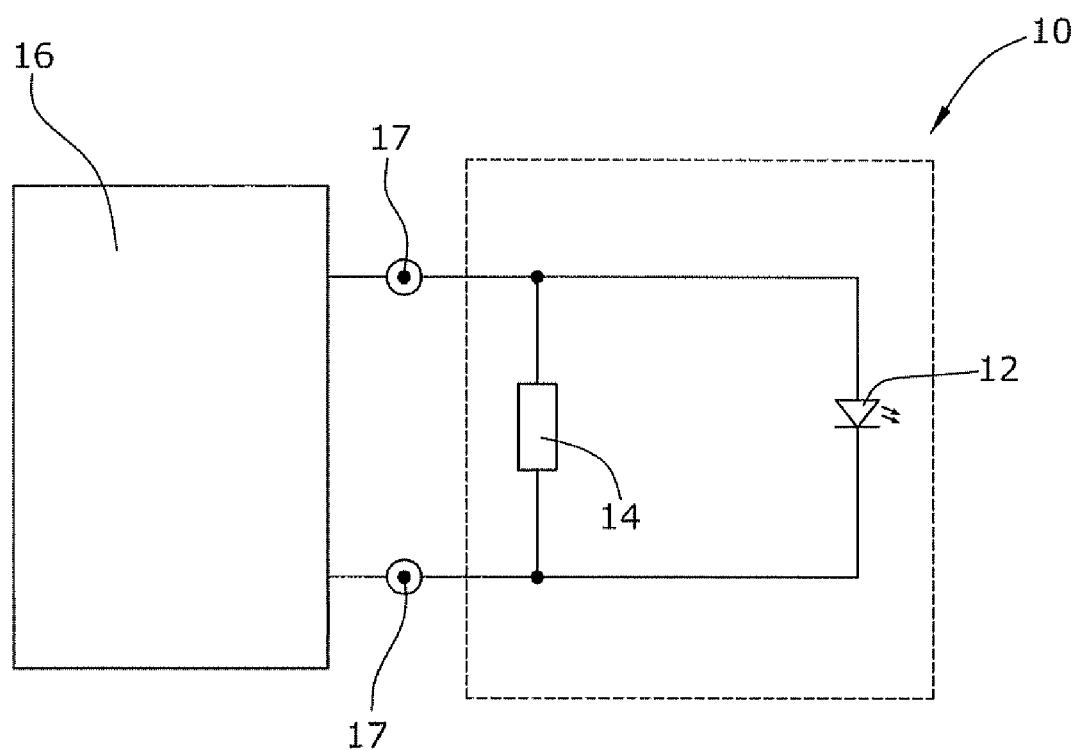
FIG. 3 shows a block diagram of customary circuit of an LED reading light for an airplane.

In FIG. 3 the circuit to be encountered at present, e.g., in airplanes, of an LED seat light/reading light is represented schematically. The LED reading light 10 comprises an LED light means 12 which is disposed in a housing with a cooling element and light pane. Connected in parallel to the LED light means 12 is a coding resistor 14 which is also a component of the LED reading light 10. In the schematic representation according to FIG. 3 the housing, the cooling element, the light pane, and other components belonging to the LED reading light are not represented since these components are not relevant to the invention.

The power supply, and in particular the constant-current supply, of the LED light means 12 is provided by a power supply unit 16 to which the power supply connections 17 of one or more reading lights 10 of the airplane are connected and to which moreover the other components disposed in a so-called PSU (passenger service unit) are also connected. The power supply unit 16 is sometimes also called "the passenger interface & supply adapter."

The power supply unit 16 provides the LED light means 12 with current if the LED reading light is switched on. In that process the LED reading light is dimmed up when switched on and dimmed down when switched off, although these features are not relevant to the invention.

The parameter of the coding resistor 14, which is read by the power supply unit 16 before the constant-current supply of the LED light means 12, determines the magnitude of the constant current so that the LED light means 12 gives off light with the desired intensity and in fact even when the light yield of the LED light means used is different.

The basic problem with LED lights consists in the fact that the LED light means are constantly being developed further, where already even now, and also in the future, types of LED light means will probably be available which give off more light at the same current. Furthermore, there is a wide variation with regard to light yield for LED light means. Since however in the case of power supply units installed in present day civilian airplanes a constant current with one of a few (at present four) possible magnitudes can be selected, in view of the technically possible light yield in modern LED light means any adaptation of the current to the variety of light yields provided in modern LED light means is no longer possible. The airplane manufacturer however demands that the reading lights always work, or are shipped with, the same brightness/intensity, which in particular must be guaranteed when exchanging a defective reading light for a new one.

Figure 1:
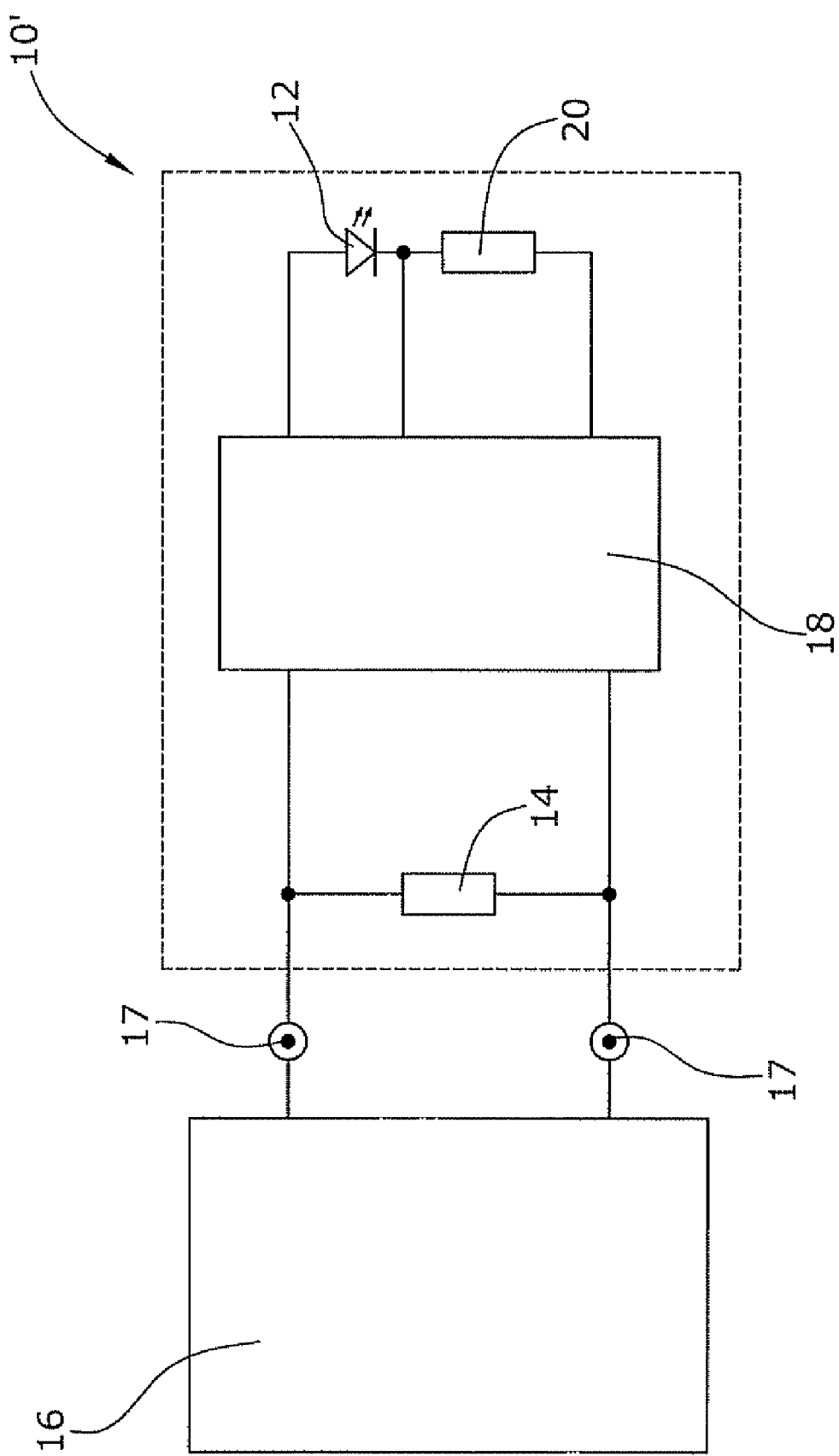
FIG. 1 shows a block diagram of a first variant of an LED reading light with a constant-current magnitude determined by a measuring resistor.

In order to solve this problem, we propose according to a first embodiment example of the invention an LED reading light 10' with a circuit according to FIG. 1. In FIG. 1 those elements which are identical or have the identical function as the elements as shown in FIG. 3 are provided with the same reference numbers.

The LED reading light 10' according to the first embodiment example of the invention according to FIG. 1 comprises, along with the LED light means 12, once again a coding resistor 14, which is chosen to be the same for all the LED reading lights and has a value at which the power supply unit 16 supplies the maximum power supply current (constant current). Between the coding resistor 14 and the LED light means 12 a current controller 18 is connected, which selects the operating current for the LED light means 12 as predetermined by a current-measuring resistor 20 which is connected in series to the LED light means 12. The value of the current-measuring resistor 20 can then be adapted to the LED light means 12 and its electro-optical parameters. For the adaptation to the light yield given by an LED light means 12 it is then possible to choose between a significantly greater number of different resistances than is the case for the coding resistor 14. For the power supply unit 16 the LED reading light 10' presents itself as a normal LED reading light 10' with a coding resistor which is coded for maximum current supply. Thus, despite the connection of an LED reading light 10' with a modern LED light means 12, the power supply unit 16 can operate just as in the case of an LED light means 12 that was selected, according to the earlier classification, from one of the four groups. The power supply unit 16 therefore continues to read out the coding resistor 14 during the initialization of that power supply unit, or at the latest when the LED reading light 10' is switched on, where the dimming up and down of the LED light means 12 when the LED reading light 10 is switched on or off can be retained unchanged.

Figure 2:
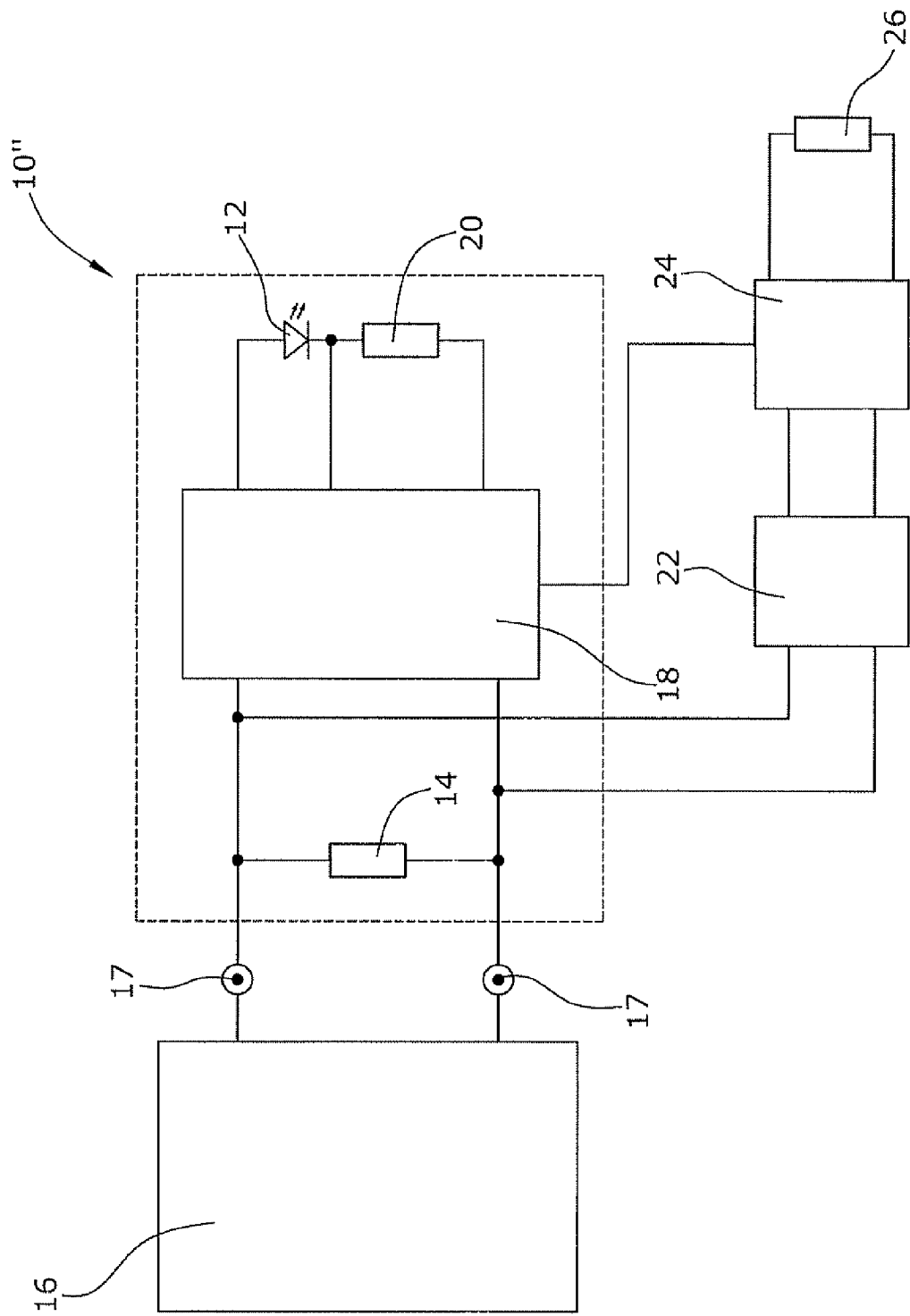
FIG. 2 shows a block diagram of a second embodiment example of the LED reading light in which the current controller supplying the constant current can be controlled with the aid of a microcontroller and is thus programmable.

A second variant of an LED reading light 10" with a circuit according to the invention is shown in FIG. 2. Also here it is the case that those elements in FIG. 2 which are identical or analogous to the elements of the reading light circuit according to FIG. 1 are provided with the same reference numbers as in FIG. 1. Therefore the LED reading light 10" according to FIG. 2 once again comprises a coding resistor 14 whose value is chosen is such a manner that the power supply unit 16 signals the provision of the maximum power supply current. Lying in series with the LED light means 12 is once again a current-measuring resistor 20, where this series circuit is provided by a current controller with a constant current whose magnitude is determined by the parameter of the current-measuring resistor 20. In the embodiment example according to FIG. 1 the current controller 18 is located between the coding resistor 14 and the series circuit which consists of the LED light means 12 and the current-measuring resistor 20.

At the input connections (17) of the LED reading light 10" a voltage controller 22 is furthermore connected which provides a microcontroller 24 with an operating voltage. The microcontroller 24 then controls the current controller 18, via, for example, a PWM signal. The PWM duty factor can be adapted by the microcontroller 24 individually according to the electro-optical parameters of the LED light means 12, by means of which its brightness can be adjusted. Since the microcontroller 24 has, for example, analogous inputs, it is possible in manufacturing, during the light measurement via a trimming resistor 26 or via a variable voltage, to individually set the desired PWM duty factor so that the required light values of the light means used for the LED reading light 10" are obtained. After the removal of the trimming resistor 26 the microcontroller 24 stores the PWM duty factor long-term in an internal memory. In this realization the current-measuring resistor 20 then does not have to be changed depending on the LED light means 12 used. Rather, for all the LED light means 12 of one type the same current-measuring resistor 20 can be used in each case. Finally, already manufactured LED reading lights can be retroactively "reprogrammed" for another brightness class.

At this point let it be said with regard to the embodiment example according to FIG. 2 that the programming of the microcontroller 24 with the aid of the trimming resistor 26 is only one of many possibilities. It is crucial in the variant according to FIG. 2 that, before or after the manufacture of the LED reading light, its brightness can be set by programming or the like and thus can be adapted to concrete requirements.

What is claimed is:

1. An LED reading light module comprising:
    two power supply connections (17) for connection to an external power supply unit (16),
    an LED (12) for giving off light with a desired light intensity,
    a coding component (14), comprising a coding resistor having a value that specifies the magnitude of a current for the LED module to be provided by the external power supply unit (16), and
    a current controller (18) providing an operating current for the operation of the LED (12), the operating current being independent of the current provided by the external power supply unit,
    wherein the coding component (14) causes the external power supply to provide the maximum power supply current that can be provided by the external power supply unit (16), and
    wherein the current controller (18) adjusts the operating current to a value at which the LED (12) gives off light with the desired light intensity.

2. The LED reading light module according to claim 1, further comprising a measuring resistor (20) which is connected to the current controller (18) and whose value specifies the magnitude of the operating current for the LED (12).

3. The LED reading light module according to claim 1, further comprising a voltage controller (22) connected to the power supply connections (17) for generating a supply voltage to a control unit (24) for operation of the current controller (18).

4. The LED reading light module according to claim 1, wherein the coding component (14) is connected to the power supply connections (17) and the current controller (18) is disposed between the coding component (14) and the LED (12).

5. A method of providing illumination light within a passenger transportation vehicle having a vehicle electrical power supply unit, the method comprising the steps of:
    providing an LED reading light module comprising an LED selected from several classes of LEDs which are distinguished by the feed current required for each LED to produce a predetermined light intensity, the LED reading light module further comprising a coding component having a value that causes the vehicle electrical power supply unit to provide a maximum power supply current to the LED reading light module;
    connecting the LED reading light module to the vehicle electrical power supply, whereby the coding component causes the vehicle electrical power supply to provide the maximum power supply current to the LED reading light module;
    regulating, by means of a separate current controller contained within the LED reading light module, the current supplied to the LED so that the LED produces a predetermined light intensity independent of the power supply current provided by the vehicle electrical power supply.

* * * * *